(12) United States Patent
Burbank et al.

(10) Patent No.: US 6,935,923 B2
(45) Date of Patent: Aug. 30, 2005

(54) SENSOR STRIPE ENCAPSULATION LAYER IN A READ/WRITE HEAD

(75) Inventors: Daniel Paul Burbank, Minneapolis, MN (US); Kevin Richard Heim, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 153 days.

(21) Appl. No.: 10/387,156

(22) Filed: Mar. 12, 2003

(65) Prior Publication Data

US 2004/0179307 A1 Sep. 16, 2004

(51) Int. Cl.[7] .......................... B24B 49/00; B24B 51/00
(52) U.S. Cl. .................... 451/5; 451/8; 451/10; 451/41; 451/908; 360/113; 360/126; 29/603.1; 29/603.9; 700/119
(58) Field of Search ..................... 451/5, 8, 10, 41, 451/57, 908; 29/603.1, 603; 360/113, 126; 700/119

(56) References Cited

U.S. PATENT DOCUMENTS

| | | | | |
|---|---|---|---|---|
| 3,710,235 A | * | 1/1973 | Barranger et al. ......... 324/210 |
| 4,457,114 A | * | 7/1984 | Hennenfent et al. ......... 451/53 |
| 4,689,877 A | * | 9/1987 | Church ..................... 29/603.1 |
| 5,073,836 A | | 12/1991 | Gill et al. .................. 360/113 |
| 5,494,473 A | * | 2/1996 | Dupuis et al. ................ 451/1 |
| 5,742,459 A | | 4/1998 | Shen et al. ................. 360/113 |
| 5,755,612 A | * | 5/1998 | Schaenzer et al. ............ 451/5 |
| 5,816,890 A | * | 10/1998 | Hao et al. ..................... 451/5 |
| 5,956,215 A | | 9/1999 | Schmalhorst et al. ....... 360/113 |
| 6,047,224 A | | 4/2000 | Stover et al. ............... 700/119 |
| 6,134,080 A | | 10/2000 | Chang et al. ............... 360/126 |
| 6,162,582 A | | 12/2000 | Hsiao et al. ................ 430/312 |
| 6,262,869 B1 | | 7/2001 | Lin et al. ............... 360/324.11 |
| 6,347,983 B1 | | 2/2002 | Hao et al. .................... 451/57 |
| 2002/0053129 A1 | | 5/2002 | Watanuki ................. 29/603.07 |

OTHER PUBLICATIONS

*The Complete Handbook of Magnetic Recording*, 3rd Edition, Finn Jorgensen, (Tab Professional and Reference Books 1988), pp. 248–249.
*The Magnetic Disc Drive Technology*, Kanu G. Ashar, (IEEE Press 1997), pp. 148–149.

* cited by examiner

*Primary Examiner*—Lee D. Wilson
*Assistant Examiner*—Anthony Ojini
(74) *Attorney, Agent, or Firm*—Westman, Champlin & Kelly

(57) ABSTRACT

A magnetoresistive read head has read head layers that are shaped to form an air bearing surface and a sensor stripe cavity with an open side at the air bearing surface. A sensor stripe is deposited in the sensor stripe cavity. The sensor stripe has a front surface that is set back from the air bearing surface to define an encapsulation cavity extending from the front surface to the air bearing surface. An encapsulation layer is deposited in the encapsulation cavity. The encapsulation layer encapsulates the front surface.

22 Claims, 11 Drawing Sheets

SENSOR STRIPE ENCAPSULATION LAYER IN A READ/WRITE HEAD

FIELD OF THE INVENTION

The present invention relates generally to read/write heads, and more particularly but not by limitation to a sensor stripe in a read/write head.

BACKGROUND OF THE INVENTION

In a common method for manufacturing magnetic recording heads for use in disk drives, each magnetoresistive sensor, or reader, and its associated magnetic writer is fabricated on a surface of a wafer as one head in an array of heads arranged in rows and columns. After completion of the wafer fabrication process, the wafers are sawed into bars, with each bar containing one row of heads. Each bar is then lapped very precisely to machine a critical "stripe height" reader dimension by mechanically removing one edge of a relatively high "stripe" feature defined lithographically in the wafer process.

One problem with this mechanical lapping process is that the magnetoresistive sensor stripe typically consist of several thin layers of magnetic material that readily oxidize when exposed at the lapped surface. In addition, the layers of the sensor can be mechanically disturbed at the lapped edge. The performance of the magnetoresistive sensor is critically dependent on the stripe's proximity to the lapped, or "air bearing surface" of the head, and on the compliance of the stripe height to tight dimensional specifications. Thus, any chemical or mechanical damage to the lapped edge of the stripe results in degraded sensor performance. Mechanical damage is particularly harmful to the performance of "tunneling magneto resistive" or TMR sensors because such sensors rely on a exceedingly thin, and easily damaged insulating quantum tunneling barrier.

A method and apparatus are needed that provide a precisely controlled stripe height and that provide freedom from chemical and mechanical damage due to lapping. Embodiments of the present invention provide solutions to these and other problems, and offer other advantages over the prior art.

SUMMARY OF THE INVENTION

Disclosed is a magnetoresistive read head that comprises read head layers that are shaped to form an air bearing surface and a sensor stripe cavity between the read head layers. The sensor stripe cavity has an open side at the air bearing surface.

A sensor stripe is deposited in a location that will later become the sensor stripe cavity. The sensor stripe has a top side surface and an opposite bottom side surface. The sensor stripe has end surfaces and a back surface that are encapsulated by the read head layers.

The sensor stripe also has a front surface that is set back from the air bearing surface to define an encapsulation cavity extending from the front surface to the air bearing surface. An encapsulation layer is disposed in the encapsulation cavity. The encapsulation layer encapsulates the front surface.

Also disclosed is a read head electrical lap guide that includes a shape with a periodic feature.

Other features and benefits that characterize embodiments of the present invention will be apparent upon reading the following detailed description and review of the associated drawings.

DETAILED DESCRIPTION OF ILLUSTRATIVE EMBODIMENTS

In present day read/write head processing, it is quite common to require a specified stripe height in the range of 50 nm to 100 nm. Present lapping techniques permit lapping the stripe to the specified target with a standard deviation of less than 2 nm, when stripe dimension is inferred from the electrical resistance of the sensor. Subsequent changes in sensor electrical resistance indicate the presence of oxidation to a depth of approximately 10 nm from the lapped air bearing surface, resulting in a loss of sensor performance. This exposed, potentially damaged edge of the sensor that is closest to the disc is expected, by design, to produce the largest portion of the magnetoresistive signal. Thus oxidation, corrosion, or mechanical damage of this edge has a disproportionately adverse effect on the sensor performance.

In the embodiments described below, one or both edges of the magnetoresistive sensor are finished to comply with the precise final stripe height dimension during the wafer process. The sensor stripe is not lapped, and the stripe height is independent of the lapping process. During the wafer process, a thin, mechanically strong electrical insulator and oxidation barrier (also called an encapsulation layer) is deposited to protect, or "passivate" one or both edges of the sensor stripe. Concurrently, an electronic lapping guide, or ELG, is patterned in such a way as to permit precise determination of mechanical lapping endpoint. Instead of stopping the lapping process when the sensor stripe height is reduced to the specified value, in the presently disclosed arrangement, lapping is terminated precisely within the passivation layer protecting the sensor. In a manufacturing process, the target for remaining passivation layer thickness would be at least three times the standard deviation of the lapping process endpoint targeting capability. In the present process using patterned electrical lap guides, standard deviation of less than 6 nm can be achieved.

This standard deviation is less than the 10 nm damaged edge zone often seen using the past process of lapping the sensor stripe. Heads manufactured with the proposed process perform better than those fabricated with the past process because the sensor to air bearing surface distance is smaller, and the sensor's mechanical integrity is not harmed. The processes and read/write heads are described in more detail below in connection with FIGS. 2–10.

Figure 1:
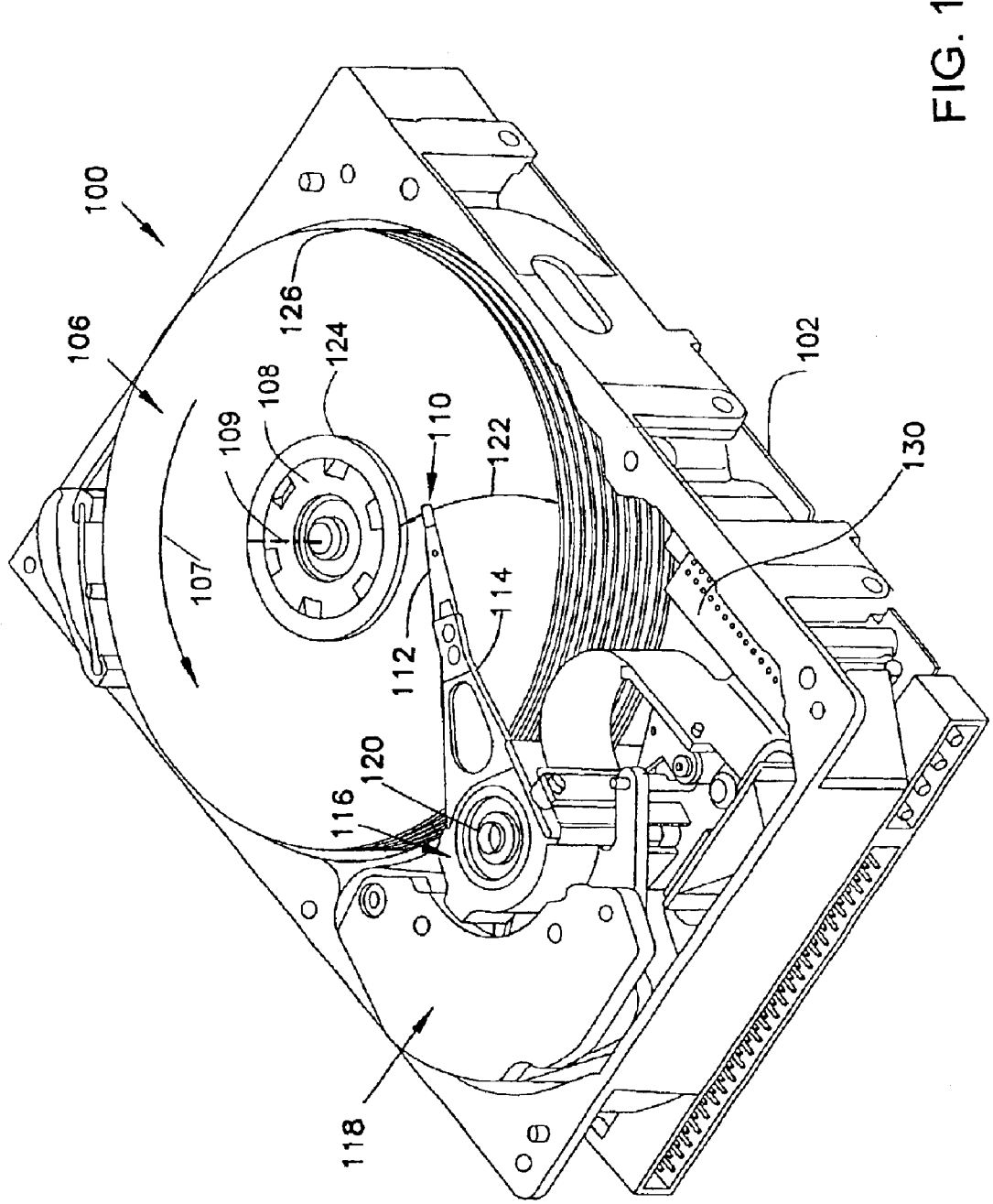
FIG. 1 is an isometric view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown).

Figure 2:
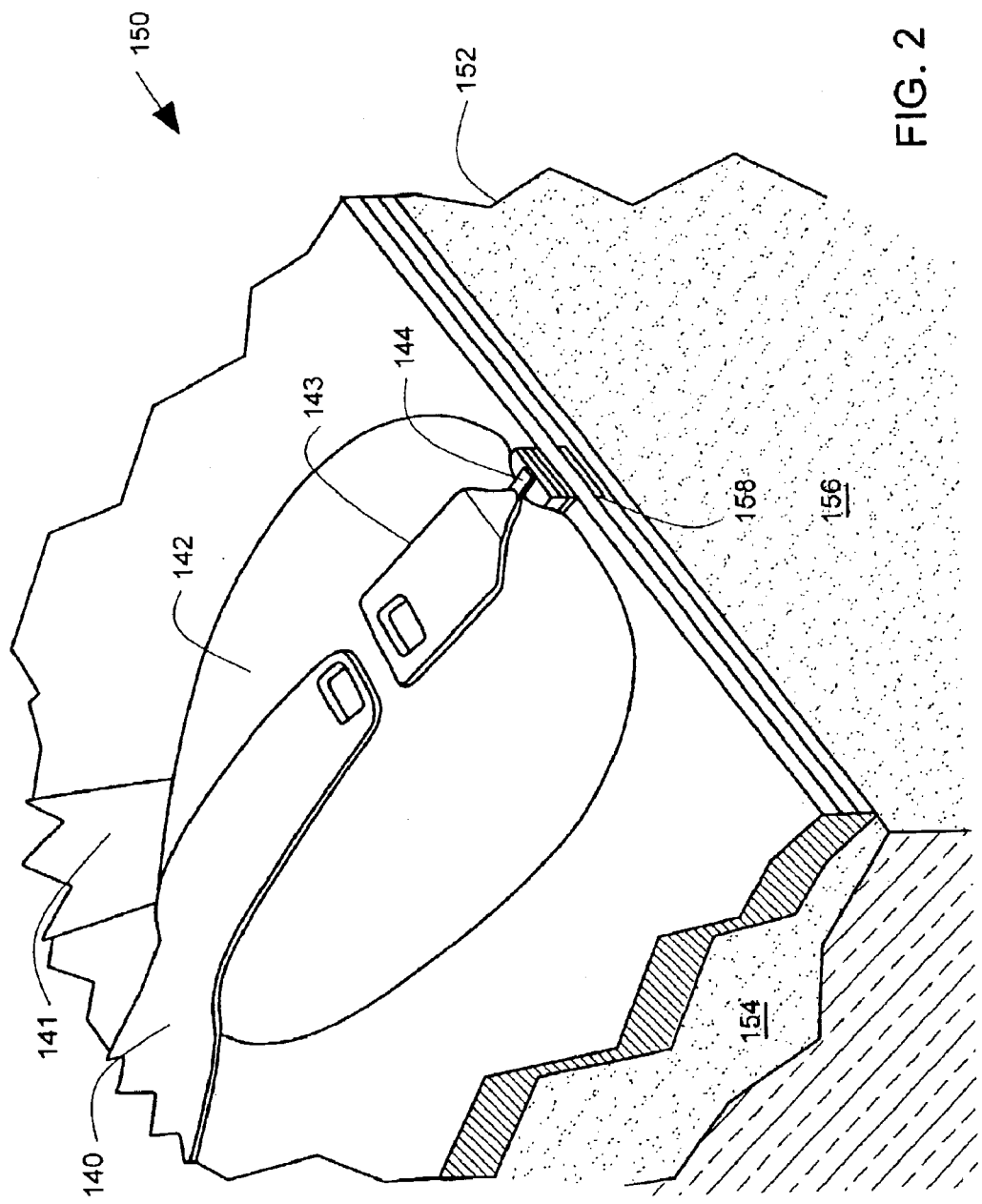
FIG. 2 schematically illustrates a read/write head for a disc drive.

FIG. 2 schematically illustrates a portion of a read/write head 150. The read/write head 150 can be used to access data on a disc in a disc drive such as disc drive 100 illustrated in FIG. 1.

In FIG. 2, the read/write head 150 includes a slider substrate 152 that has a slider trailing edge surface 154 and an adjacent air bearing surface 156. The substrate 152 is typically formed of silicon or AlTiC. The slider trailing edge surface 154 is typically perpendicular to the adjacent air bearing surface 156. The read/write head 150 includes electrical leads 140, 141 that connect to a write coil (hidden from view in FIG. 2), a top coat insulating layer 142 and a write pole body 143 joined to a write pole tip 144. The read/write head 150 also include a read head that is recessed relative to the air bearing surface 156 and hidden from view. The read head includes a sensor stripe that has a front surface that is set back from the air bearing surface 156 to define an encapsulation cavity that extends from the sensor stripe to the air bearing surface 156. The encapsulation cavity is filled with an encapsulation layer 158 that encapsulates the front surface of the sensor stripe. The arrangement of the read head and the encapsulation layer is described in more detail below in connection with FIGS. 3(B), 4.

Figure 3:
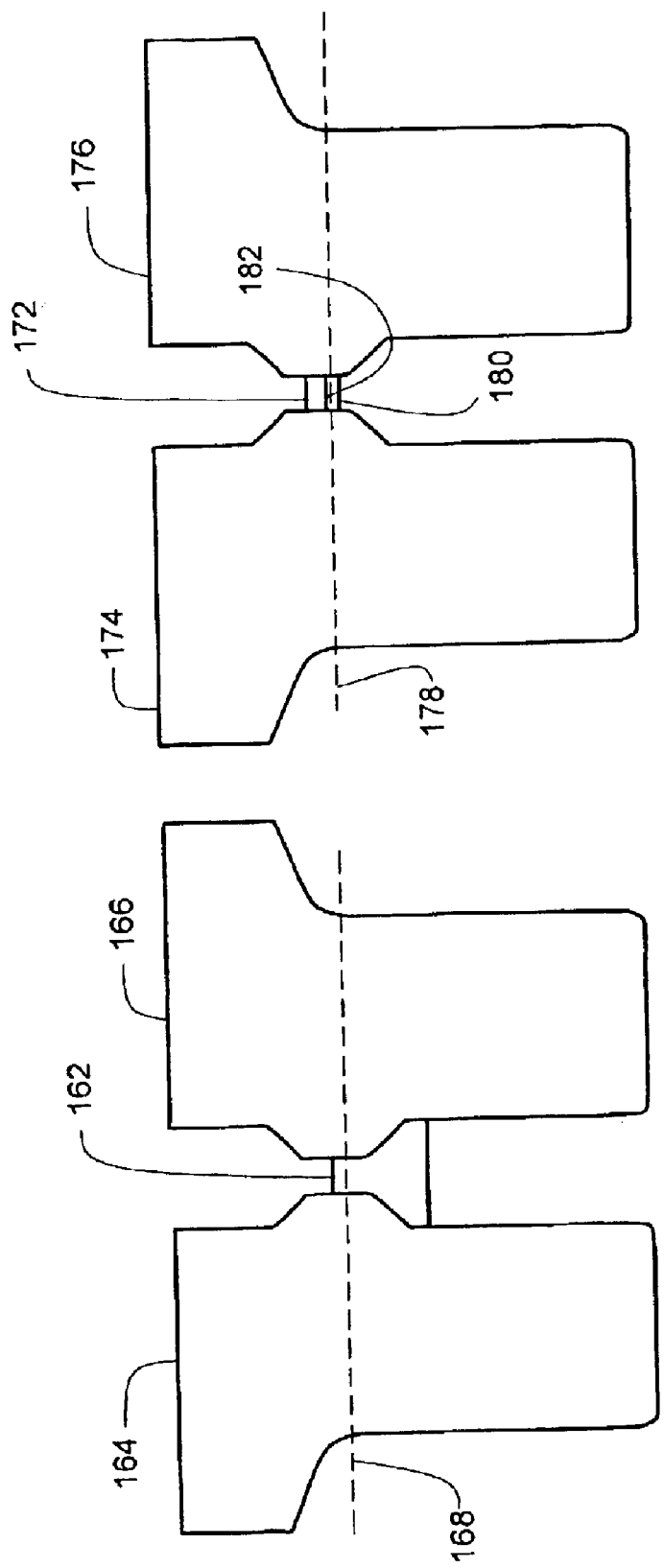
FIG. 3 illustrates a prior art method of lapping that exposes a sensor stripe at 3(A) in comparison to a presently disclosed method of partially lapping away an encapsulation layer so as not to expose a sensor stripe at 3(B).

FIG. 3 illustrates a method of lapping that exposes a sensor stripe at 3(A) PRIOR ART in comparison to a presently disclosed method of lapping that does not expose a sensor stripe illustrated at 3(B).

At 3(A) PRIOR ART, a wafer lithographic process is used to define or deposit a magnetoresistive sensor stripe 162 and read head electrical contacts 164, 166 along with other layers on a substrate of a head such as the substrate 152 in FIG. 2. The magnetoresistive sensor stripe 162 is initially deposited with a height that is larger than needed, and then the head is lapped to remove excess material. Deposition of the various layers is typically done on complete wafers in an environment that is evacuated, and contact between the sensor stripe 162 and air is avoided before a protective oxidation barrier layer is deposited. Lapping, however, is done on bars of heads in the presence of air. The lapping removes material up to a line 168 which defines the air bearing surface. The lapping process is used to precisely control the stripe height of the sensor stripe 162. The lapping process, however, also mechanically damages the exposed edge of the sensor stripe 162 and the exposed edge is also subject to oxidation and other corrosion processes as a result of the lapping step. The PRIOR ART process at 3(A) achieves the result of a narrow stripe height, but at the expense of edge damage and corrosion which tends to effectively move the sensitive parts of the sensor stripe 162 away from the air bearing surface at line 168. The overall sensitivity of the sensor stripe 162 to magnetic media is thus reduced undesirably.

In the present process illustrated at 3(B), a wafer lithographic process is used to define, preferably by milling, a magnetoresistive sensor stripe 172 and read head electrical contacts 174, 176 (which also serve as magnets) along with other layers on a substrate of a head such as the substrate 152 in FIG. 2. In particular, an encapsulation layer 180 (also called a feature layer) is deposited to encapsulate a front surface 182 of the sensor stripe 172. The magnetoresistive sensor stripe 162 is initially deposited with a stripe height that is the desired stripe height, and there is no need to lap the sensor stripe 172 to remove excess material. Deposition of the various layers, including the encapsulation layer 180 is done on complete wafers in an environment that is evacuated, and the sensor stripe 172 is effectively sealed to prevent future contact with the air. Lapping, is done on bars of heads in the presence of air. The lapping removes material up to a line 178 which defines the air bearing surface. The lapping process is used to precisely define a thickness of the encapsulation layer 180. The lapping process, however, does not come in contact with the front surface 182 of the sensor stripe 172 and the front surface 182 of sensor stripe 172 is not subject to corrosion or mechanical damage due to the lapping process. The present process at 3(B) achieves the result of a narrow stripe height, but without the expense of edge damage and corrosion to the sensor stripe 172. The overall sensitivity of the sensor stripe 172 to magnetic media is thus enhanced. An undamaged, uncorroded front surface 182 of the sensor stripe 172 can fly in close proximity to the media to provide a high level read signal.

In preferred arrangements, optical lithography chromeless phase shift masks or electron beam lithography are used to precisely define the stripe height of sensor stripe 172. The sensor stripe is positioned so that its front surface is a few nanometers above the lapped air bearing surface at 178.

Figure 4:
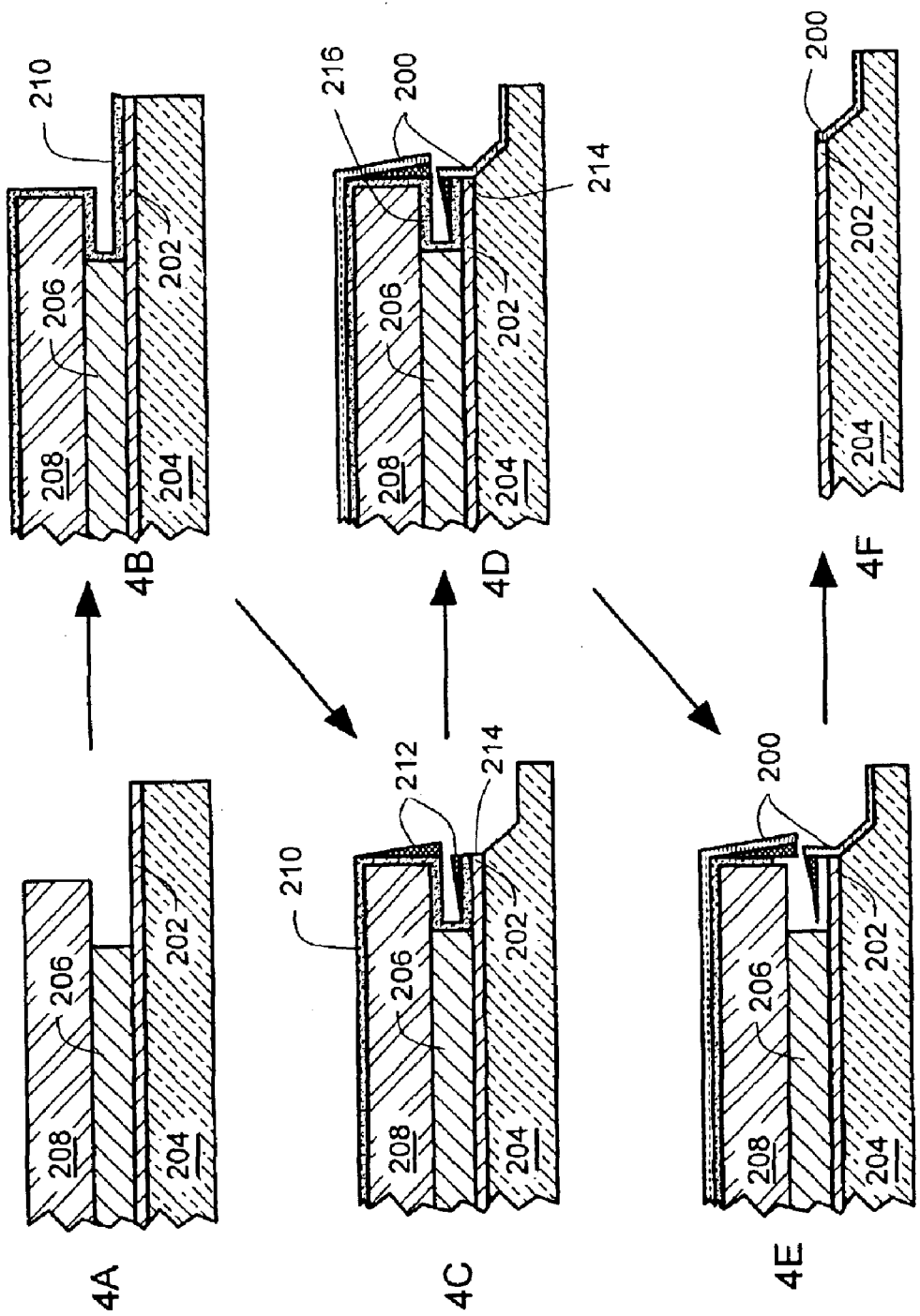
FIG. 4 illustrates exemplary process steps used to form an encapsulation layer protecting a sensor stripe.

FIG. 4 illustrates exemplary processes 4A–4F used to form an encapsulation layer 200 (also called a feature layer) that protects or passivates a sensor stripe 202 illustrated at process 4F. To protect the sensor stripe, the encapsulation layer 200 (also called an oxidation barrier layer 200) is deposited over the sensor stripe 202 after the sensor stripe 202 is patterned and etched, to provide good mechanical properties for immunity to lapping damage. Encapsulation layer 200 preferably comprises Tantalum (Ta), TaN or diamond-like-carbon (DLC). The encapsulation layer 200 is preferably deposited while the substrate is still in an air-free or vacuum environment to avoid oxidation of the sensor stripe 202 before the encapsulation layer 200 is in place. While only a single sensor stripe edge is illustrated in FIG. 4, it is understood that the process of FIG. 4 can be performed on both the top and bottom edges of sensor stripe 202 and that the process of FIG. 4 is performed on multiple sensor stripes 202 on a wafer of substrate material such as AlTiC or silicon.

Processing starts at process 4A. A "first half gap" layer 204 is deposited under the sensor stripe 202. The first half gap layer 204 preferably comprises alumina. Next, the sensor stripe 202 is deposited on the first half gap layer 204, and then patterned and etched. The sensor stripe 202 can comprise a giant magnetoresistor (GMR), a tunneling magnetoresistive (TMR) stack or other known magnetoresistive sense element. Next, a lift off structure including a layer 206 and a layer 208 are deposited over the sensor stripe 202. The layer 206 preferably comprises a polymer such as polydimethylglutarimide (PMGI) available from Shipley Company in Marlboro, Mass. The layer 208 comprises a resist material such as positive DUV resist (UV-6) available from Shipley Company in Marlboro, Mass. The PMGI layer 206 and the resist layer 208 are lithographically patterned in order to temporarily define a desired surface shape to receive a temporary alumina layer 210 of a desired shape in a subsequent process 4B.

At process 4B, the temporary alumina layer 210 is deposited by an atomic layer deposition process, or a comparable process that provides conformal dielectric coverage. At process 4B, the sensor stripe 202 is therefore temporarily sealed between the first half gap layer 204 and the temporary alumina layer 210.

At process 4C, the arrangement is shown after an ion milling stripe etch process. The ion milling stripe etch process defines a front surface 214 of the sensor stripe 220 Also, A layer of undesired redeposited resist material 212 is selectively deposited as illustrated. The layer of resist material 212 is deposited on the temporary alumina layer 202.

At process 4D, the encapsulation layer 200 is deposited. The encapsulation layer 200 covers the front surface 214 as illustrated at process 4D. The encapsulation layer 200 is preferably deposited using a collimated deposition source, leaving a portion 216 of the temporary alumina layer 210 that is left unprotected by the encapsulation layer 200.

At process 4E, a wet etch process is performed, removing the unprotected portion 216 of temporary alumina layer 210.

At process 4F, the lift off layers 206, 208 are stripped off and dry carbon dioxide cleaning particles (Eco-snow) are preferably used to clean any residual redeposited material 212 from the wafer in preparation for deposition of subsequent layers of the head.

Figure 5:
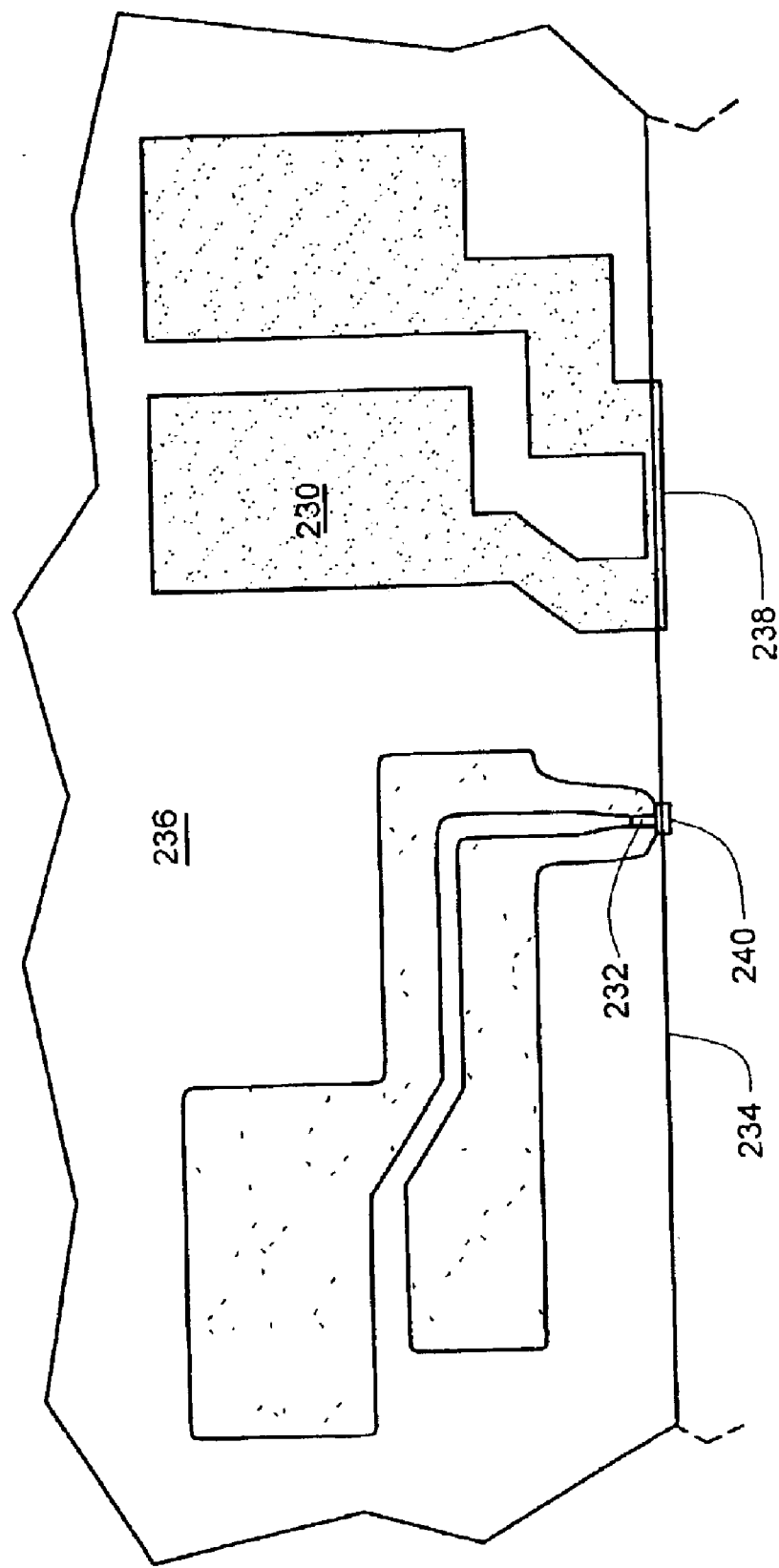
FIG. 5 illustrates positioning of an electrical lap guide (ELG) relative to a sensor stripe.

FIG. 5 illustrates positioning of an electrical lap guide (ELG) 230 relative to a sensor stripe 232 at a lapped surface 234 of a head 236. Electronic lapping guide (ELG) 230 is formed of an electrically resistive material and includes a narrow region 238 that functions as a variable resistance sensor indicating progress of lapping at lapped surface 234. The narrow region 238 is placed so that one edge of the narrow region 238 is above the final lapped air bearing surface 234, and one edge below.

Figure 6:
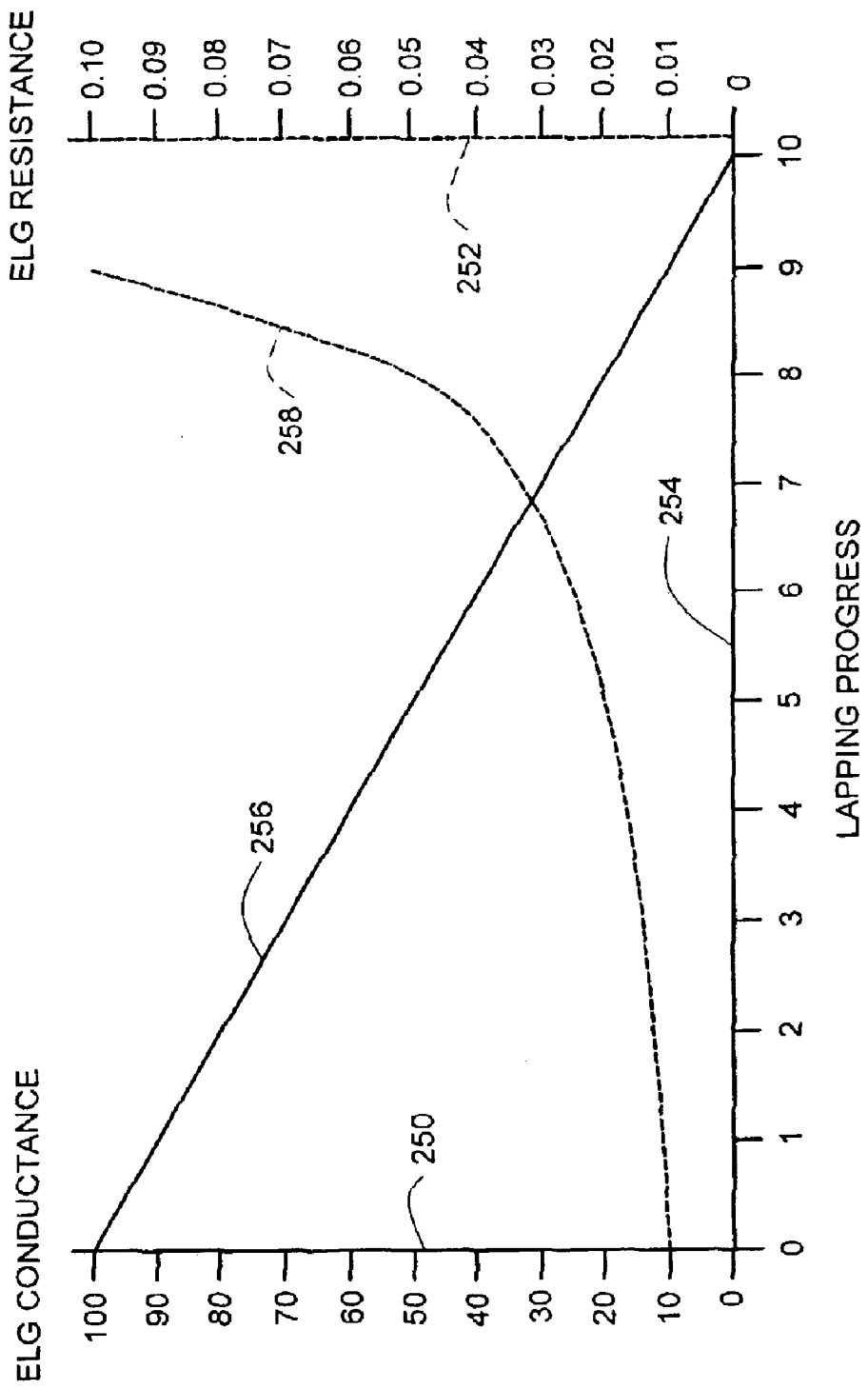
FIG. 6 illustrates ELG characteristics as a function of lapping progress.

FIG. 6 schematically illustrates electrical characteristics of ELG 230 in FIG. 5 as a function of lapping progress. A left solid vertical axis 250 indicates ELG conductance and a right dashed axis 252 indicates ELG resistance. A horizontal axis 254 indicates lapping progress. When lapping is performed at a steady rate over time, then horizontal axis 252 can also be interpreted as a time axis. As illustrated in FIG. 6, as lapping progresses, the ELG conductance (solid line 256) decreases and the ELG resistance (dashed line 258) increases. The electrical conductance 256 of the ELG 230 decreases as the lapping process removes conductive material from the lower edge of the narrowed region 238. The lapping endpoint is reasonably well determined from data of the sheet resistance and feature size variations determined from one or more auxiliary resistors (not illustrated) patterned with the same process but different length to width ratios.

Lapping surface 234 is stopped when an encapsulation layer 240 (covering a front surface of the sensor stripe 232) is at a desired thickness as indicated by the resistance of the electrical lap guide 230. Process variations in the bulk resistivity of the ELG material, the deposited thickness of the ELG material and the alignment of the narrow region 238 with the sensor stripe 232 can introduce undesired variations in the relationship between measured resistance and the finished lapped thickness of the encapsulation layer 240 (also called a feature layer). As lapping proceeds, the electrical conductance 256 decreases at a uniform rate. To stop lapping at a precise location relative to a front edge of the stripe 232, the ELG must be precisely calibrated for the desired lapping endpoint. While calibrations based on calculated data on the relationship can be relied on to obtain reasonable production yields, there is a desire to reduce the variations. As described below in connection with FIGS. 7–10, spatial patterning (encoding) is used to improve calibration of lapping endpoint.

Figure 7:
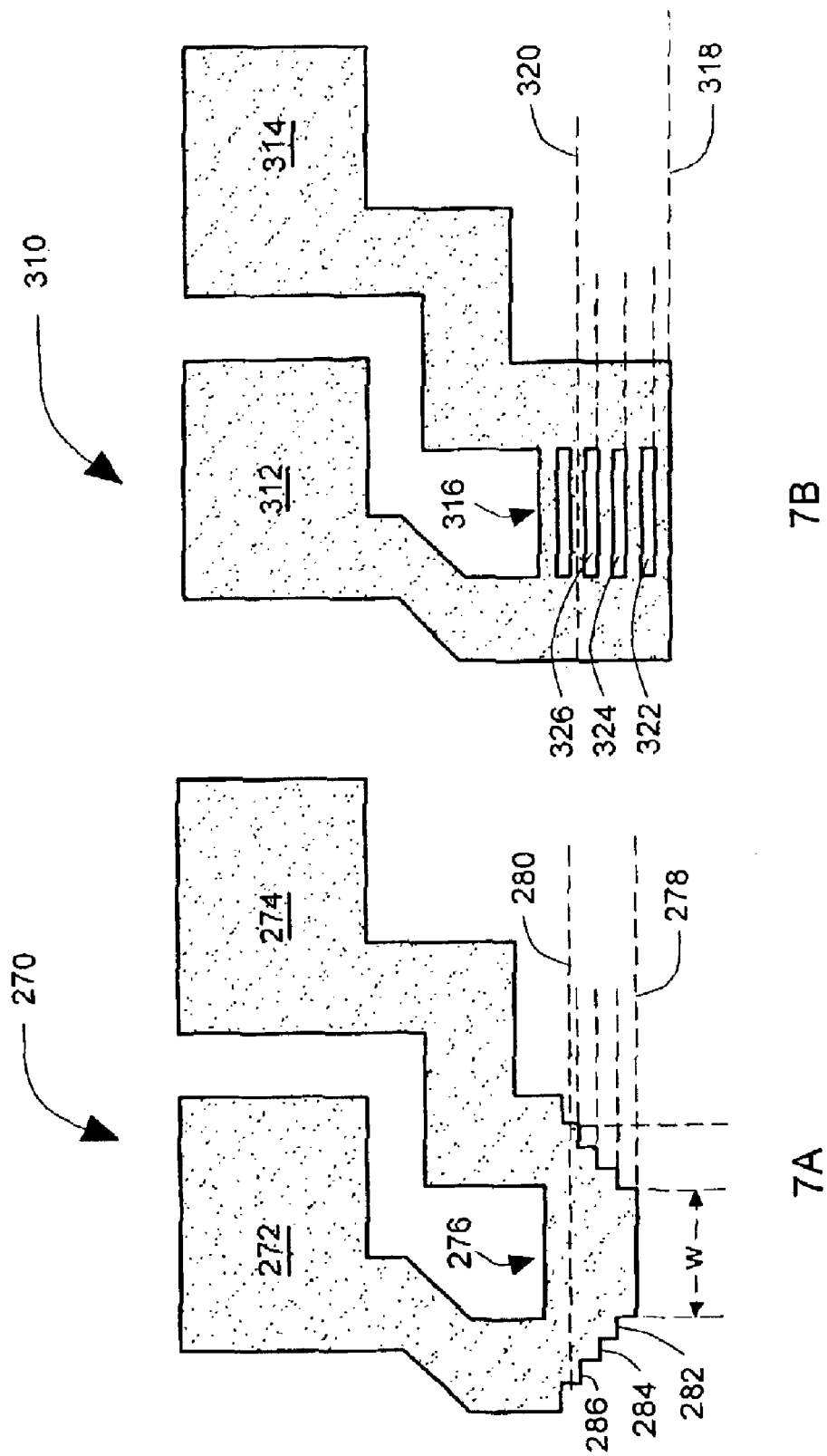
FIG. 7 illustrates examples of spatially encoded electrical lap guides.

FIG. 7 illustrates examples 7A and 7B of electrical lap guides that include spatially encoded features that allow improved calibration of the process of lapping an encapsulation layer (not illustrated in FIG. 7).

In example 7A, an electrical lap guide 270 includes relatively wide, low resistance interconnection pads 272, 274 and a narrowed stairstep region 276. The narrowed region 276 has a shape that includes steps 282, 284, 286. A width W of the narrowed region 276 along a lapping line 278 changes in abrupt steps as the lapping line moves toward a final lap line 280. As the lapping progresses, an electrical conductance (and its inverse, electrical resistance, described below in connection with FIG. 8) of the electrical lap guide 270 has a rate of change that changes abruptly at points 290, 292, 294 (FIG. 8) as each additional step 282, 284, 286 (FIG. 7) is reached by the moving lap line 278. A lapping progress interval 298 and a conductance change interval 300 between points 290, 292, for example, provide a calibration factor for calibrating a rate of conductance (or resistance) change to a rate of distance covered in the progress of the lapping. The steps 282, 284, 286 are precisely located with respect to a front surface of a sensor stripe (not illustrated in FIG. 7). As lapping progresses, the measurement circuitry attached to the lap gauge can automatically calibrate itself based on the calibration factor of the electrical lap guide 270. Using the calibration, the measurement circuitry (not illustrated) connected to the electrical lap guide 270 can then control the lapping to stop a precise distance in front of the front surface of the sensor stripe, leaving an encapsulation layer of the desired thickness in place. The electrical lap guide 270 includes a spatially periodic pattern of steps 282, 284, 286 that non-uniformly change resistance in a spatially periodic manner to provide calibration data for precisely setting a lapping endpoint at final lap line 280. The electrical lap guide 270 can be deposited using thin film techniques to precisely locate the steps 282, 284, 286 relative the front edge of the sensor stripe. The front edge of the stripe that faces the air bearing surface is not exposed to oxidation due to excessive lapping past the final lap line 280.

In example 7B, an electrical lap guide 310 includes relatively wide, low resistance interconnection pads 312, 314 and a narrowed ladder region 316. The narrowed region 316 has a shape that includes openings or slots 322, 324, 326. As lapping progresses, the electrical conductance changes as the moving lap line passes through lap guide material. As lapping progresses through one of the slots 322, 324, 326, however, the electrical conductance does not change. There are abrupt steps between change regions and plateaus. As the lapping progresses, an electrical conductance (or its inverse, electrical resistance, described below in connection with FIG. 9) of the electrical lap guide 310 has a rate of change that plateaus along lines 330, 332, 334 as the lap line 318 moves through each additional opening 282, 284, 286. A lapping progress interval 338 and a conductance change interval 340 between plateaus 330, 332, for example, provide a calibration factor for calibrating a rate of conductance (or resistance) change to a rate of distance covered in the progress of the lapping. The openings or slots 322, 324, 326 are precisely located with respect to a front surface of a sensor stripe (not illustrated in FIG. 7). As lapping progresses, the measurement circuitry attached to the lap gauge can automatically calibrate itself based on the calibration factor of the electrical lap guide 310. Using the calibration, the measurement circuitry (not illustrated) connected to the electrical lap guide 310 can then control the lapping to stop a precise distance in front of the front surface of the sensor stripe, leaving an encapsulation layer of the desired thickness in place. The electrical lap guide 310 includes a spatially periodic pattern of slots 322, 324, 326 that provide non-uniform conductance (and resistance) change in a spatially periodic manner to provide calibration data for precisely setting a lapping endpoint at final lap line 320. The electrical lap guide 310 can be deposited using thin film techniques to precisely locate the steps 322, 324, 326 relative the front edge of the sensor stripe. The sensor's air bearing surface edge is not exposed to oxidation due to excessive lapping past the final lap line 320.

Figure 8:
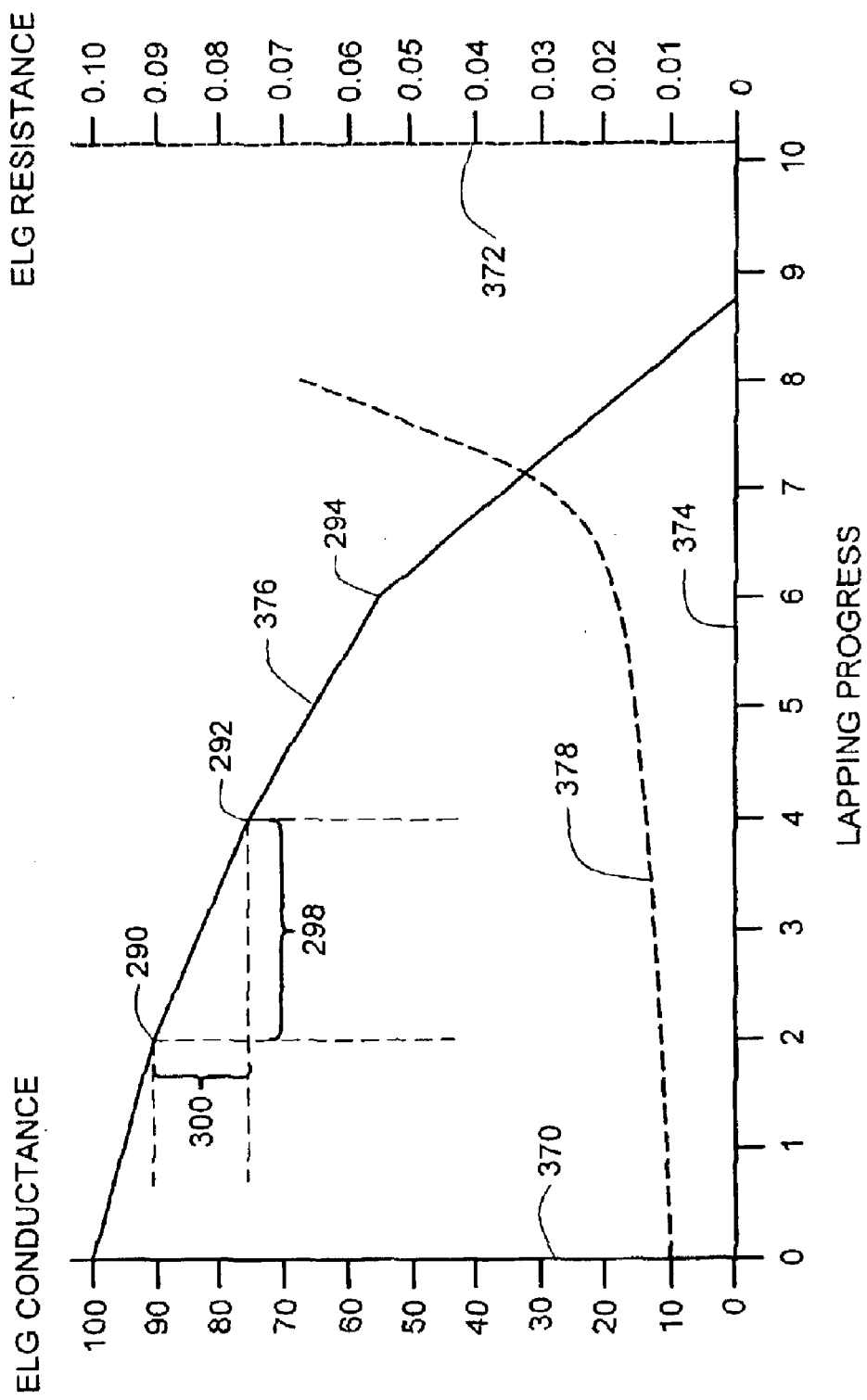
FIG. 8 illustrate electrical characteristics of the spatially encoded electrical lap guides illustrated at 7A in FIG. 7.

FIG. 8 schematically illustrates electrical characteristics of spatially encoded electrical lap guide illustrated in FIG. 7A. A solid left vertical axis 370 represents electrical conductance of the ELG lap guide 270, and a dashed right vertical axis 372 represents electrical resistance of the electrical lap guide 270. A horizontal axis 374 represents lapping progress in distance units. In the case of a lapping process that provides a constant lap rate, the horizontal axis 374 can also be interpreted as an elapsed time scale. The solid line 376 indicates electrical conductance values as the lapping progresses, and the dashed line 378 indicates electrical resistance values as the lapping progresses.

Figure 9:
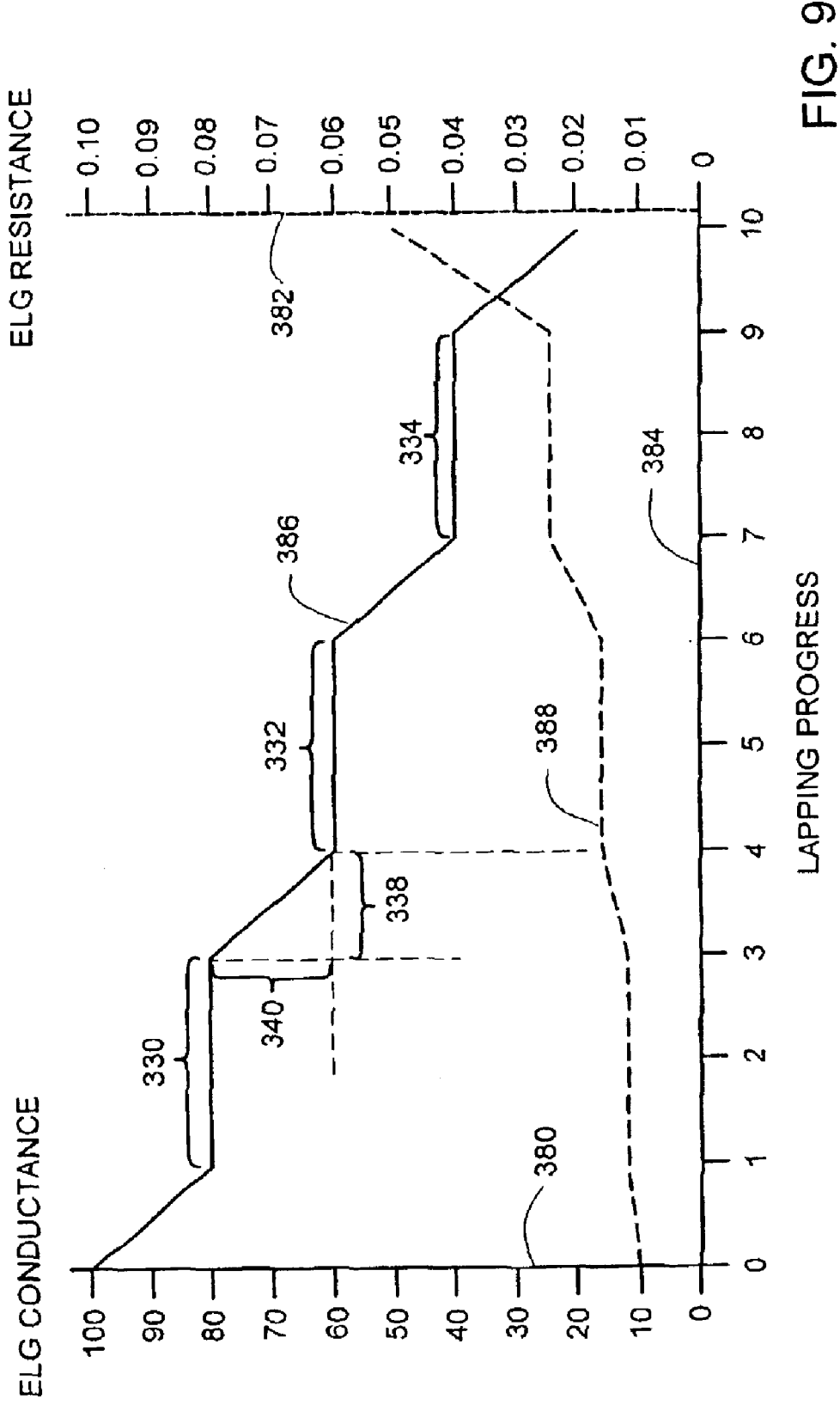
FIG. 9 illustrate electrical characteristics of spatially encoded electrical lap guides illustrated at 7B in FIG. 7.

FIG. 9 schematically illustrates electrical characteristics of spatially encoded electrical lap guide illustrated in FIG. 7B. A solid left vertical axis 380 represents electrical conductance of the ELG lap guide 310, and a dashed right vertical axis 382 represents electrical resistance of the electrical lap guide 310. A horizontal axis 384 represents lapping progress in distance units. In the case of a lapping process that provides a constant lap rate, the horizontal axis 384 can also be interpreted as an elapsed time scale. The solid line 386 indicates electrical conductance values as the lapping progresses, and the dashed line 388 indicates electrical resistance values as the lapping progresses.

In comparison with the stepped ELG illustrated at 7A, the ladder ELG illustrated at 7B gives more dramatic differences in rate of conductance increase with lapping progress as illustrated in FIG. 9. In a preferred case where lapping progresses at a nearly constant rate, the ladder ELG can give information about both lower edge and upper edge positions of ELG (and by extension, stripe) features. Flat zones or plateaus in FIG. 9, result when the lapping surface is located between ladder "rungs".

Figure 10:
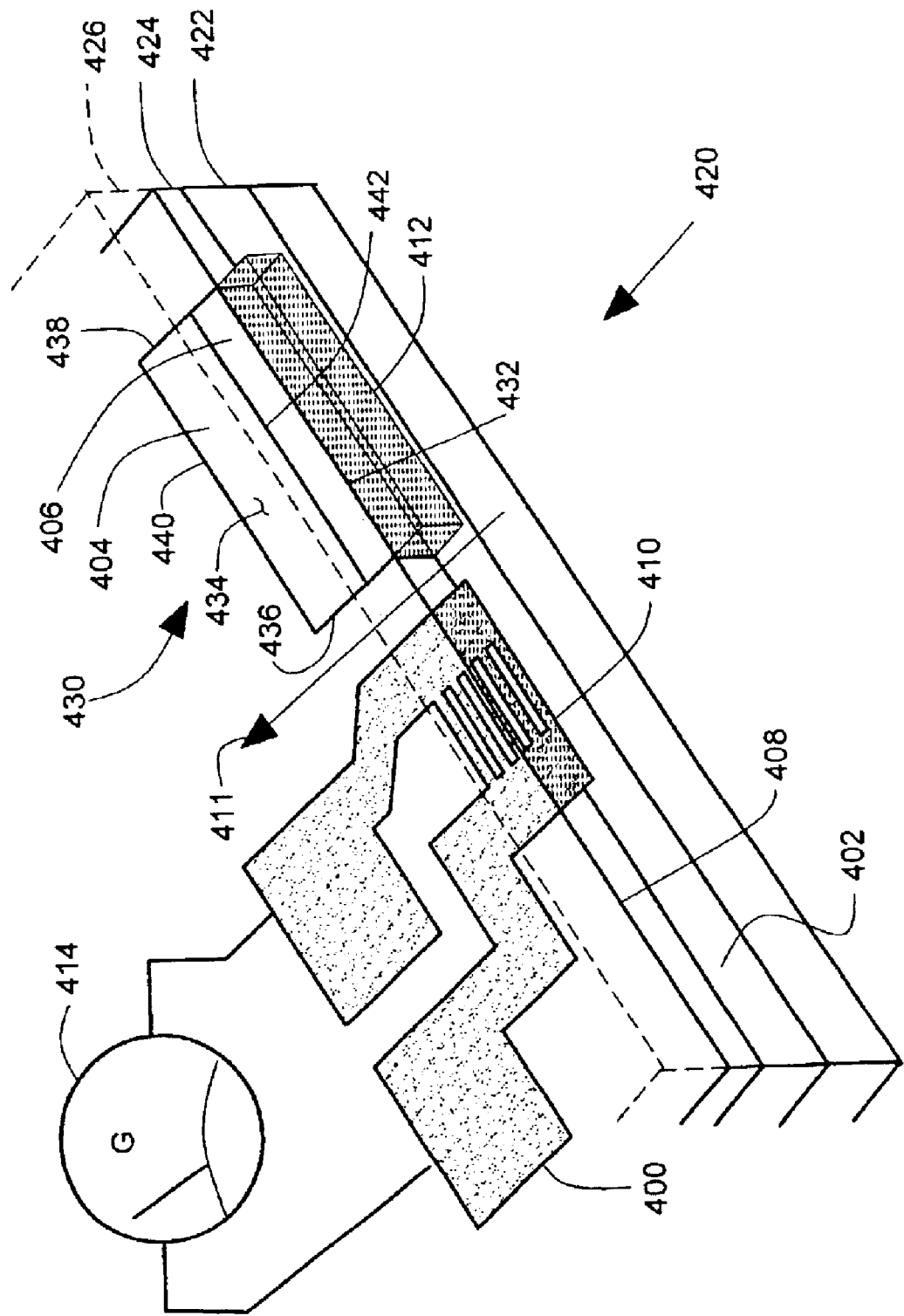
FIG. 10 illustrates lapping using a spatially encoded electrical lap guide.

FIG. 10 illustrates an oblique view of lapping using a spatially encoded electrical lap guide 400 that is similar to lap guide 310 of FIG. 7. A magnetoresistive read head 420 comprises read head layers 422, 424, 426 that are shaped to form an air bearing surface 408. The read head layers 422, 424, 426 are shaped to define a sensor stripe cavity 430 between the read head layers 422, 424, 426. The sensor stripe cavity 430 has an open side 432 at the air bearing surface 408.

A sensor stripe 404 is deposited in the sensor stripe cavity 430. The sensor stripe 404 has a top side surface 434 and an opposite bottom side surface (hidden from view in FIG. 10). The sensor stripe 404 has end surfaces 436, 438 and a back surface 440 that are encapsulated by the read head layers 422, 424, 426.

The sensor stripe 404 also has a front surface 442 that is set back from the air bearing surface 408 to define an encapsulation cavity extending from the front surface 442 to the air bearing surface 408. An encapsulation layer 406 (also called a feature layer) is disposed in the encapsulation cavity. The encapsulation layer 406 encapsulates the front surface 432. The encapsulation layer preferably fills the encapsulation cavity between the front surface and the final air bearing surface. The encapsulation layer 406 preferably has a thickness between the front surface 442 and the final air lapped bearing surface 408 of less than 6 nanometers. The encapsulation layer 406 is preferably formed of a nonmagnetic material such as tantalum (Ta), TaN or diamond-like carbon.

The sensor stripe 404 preferably has a final stripe height defined by a spacing between the back surface 440 and the front surface 442. The final stripe height is independent of a lapping depth of the air bearing surface 408.

The lap guide 400 is arranged on a substrate 402 alongside a sensor stripe 404 and an encapsulation layer 406. Lapping progresses in a direction indicated by arrow 411 and the electrical lap guide 400 and the encapsulation layer 406 are lapped to a final lap line (air bearing surface) 408. A portion 410 (marked with dashed lines) of the electrical lap guide 400 is lapped away. A portion 412 (marked with dashed lines) of the encapsulation layer 406 is lapped away. The remaining portion of the encapsulation layer 406 has a carefully controlled thickness in the lapping direction 411 that is controlled by monitoring progress of the lapping by monitoring electrical conductance (or electrical resistance) of the electrical lap guide with a monitoring circuit 414. The desired final lapped edge of the encapsulation layer 406 is aligned to fall on a resistive bar of the electrical lap guide 400 rather than a slot this alignment ensures that there will be a changing conductance reading up to the time the lapping is finally stopped. By fitting linear segments to the conductance as lapping progresses, the location of the lapping surface relative to the lower edge locations of the ELG can be calibrated "on the fly" in monitoring circuit 414 by real-time computation of the inflection points between conductance line segments.

Figure 11:
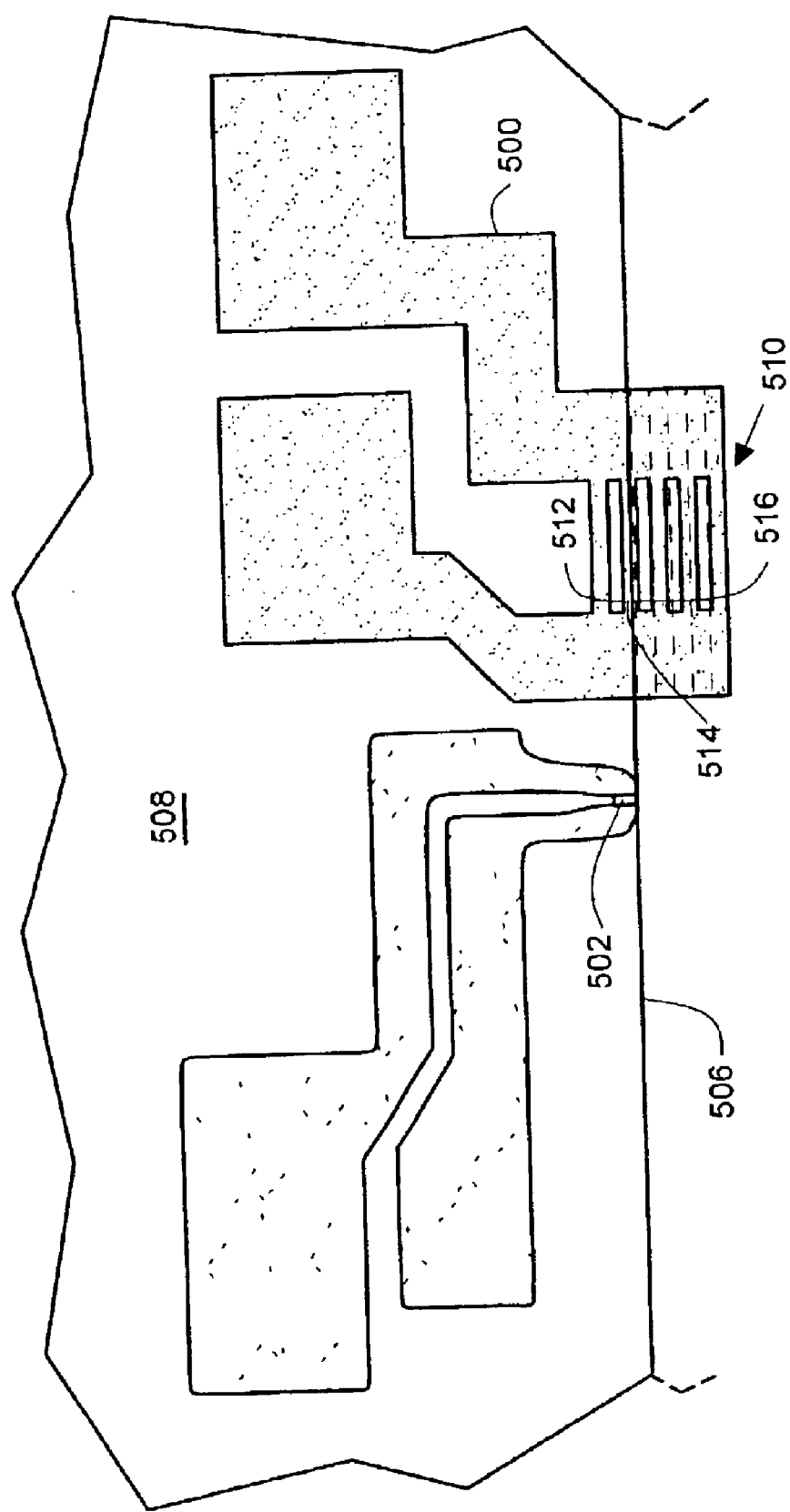
FIG. 11 illustrates positioning of an electrical lap guide (ELG) relative to a sensor stripe layer at a lapped surface of a head.

FIG. 11 illustrates positioning of an electrical lap guide (ELG) 500 relative to a sensor stripe layer 502 at a lapped surface 506 of a head 508. The head 508 does not include an encapsulation layer 240 as illustrated in FIG. 5. Electronic lapping guide (ELG) 500 is formed of an electrically resistive material and includes a periodic ladder region 510 that functions as a variable resistance sensor indicating progress of lapping at lapped surface 506. The periodic ladder region 510 is placed so that one edge 512 of a rung or solid region 514 lies above the final lapped air bearing surface 506, and one edge 516 lies below the final lapped air bearing surface. FIG. 11 illustrates that an electrical lap guide 500 with a periodic feature can be used to lap not only an encapsulation layer in some applications, but also the sensor stripe layer 502 or other feature layer in the head 508 that requires lapping in other applications. While electrical lap guide 500 is illustrated with a ladder periodic feature, other periodic features such as a stairstep feature can be used as well.

In summary, a magnetoresistive read head (such as 420) comprises read head layers (such as 422, 424, 426) that are shaped to form an air bearing surface (such as 408). The read head layers are shaped to define a sensor stripe cavity (such as 430) between the read head layers. The sensor stripe cavity has an open side (such as 432) at the air bearing surface.

A sensor stripe (such as 404) is deposited in the sensor stripe cavity. The sensor stripe has a top side surface (such as 434) and an opposite bottom side surface. The sensor stripe has end surfaces (such as 436, 438) and a back surface (such as 440) that are encapsulated by the read head layers.

The sensor stripe also has a front surface (such as 442) that is set back from the air bearing surface to define an encapsulation cavity extending from the front surface to the air bearing surface. An encapsulation layer (such as 406) is disposed in the encapsulation cavity. The encapsulation layer encapsulates the front surface.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write head while maintaining substantially the same functionality without departing from the scope of the present invention. In addition, although the preferred embodiment described herein is directed to a disc drive, it will be appreciated by those skilled in the art that the teachings of the present invention can be applied to other magnetic storage media, without departing from the scope of the present invention.

What is claimed is:

1. An electrical lap guide for use in lapping a feature layer, comprising:
    a substrate layer supporting the feature layer on a substrate layer surface that is perpendicular to an external surface; and
    a pattern of conductive material on the substrate layer, the pattern of conductive material including first and second electrical interconnection pads and a lapping region conductively joining the first and second electrical interconnection pads, the lapping region having a shape with a periodic feature to provide an electrical conductance at the first and second electrical interconnection pads that varies periodically as the external surface is lapped.

2. The electrical lap guide of claim 1 wherein the feature layer comprises an encapsulation layer.

3. The electrical lap guide of claim 1 wherein the feature layer comprises a sensor stripe layer.

4. The electrical lap guide of claim 1 wherein the feature layer has a front surface that is aligned along the external surface with the periodic feature so that a correspondingly periodic electrical conductance change is indicative of a thickness of the feature layer.

5. The electrical lap guide of claim 1 wherein the periodic feature comprises a stairstep region.

6. The electrical lap guide of claim 1 wherein the periodic feature comprises a ladder region.

7. The electrical lap guide of claim 1 wherein the electrical conductance has a rate of change with progress in lapping that is not constant.

8. The electrical lap guide of claim 1 wherein the electrical conductance provides a calibration factor for calibrating a rate of conductance change to a rate of distance covered in the progress of the lapping.

9. The electrical lap guide of claim 8 wherein the electrical conductance is measured to stop the lapping a precise distance relative to the feature layer, leaving a feature layer of a desired thickness in place.

10. The electrical lap guide of claim 1 wherein the lapping region includes a spatially periodic pattern that non-uniformly changes the electrical conductance in a spatially periodic manner to provide calibration data for precisely setting a lapping endpoint at a final lap line.

11. The electrical lap guide of claim 1 and further comprising a monitoring circuit electrically connected to the first and second electrical interconnection pads.

12. The electrical lap guide of claim 11 wherein the monitoring circuit calibrates the location of a lapping surface.

13. The electrical lap guide of claim 12 wherein the monitoring circuit fits linear segments to conductance.

14. The electrical lap guide of claim 12 wherein the monitoring circuit calibrates a location of the lapping surface relative to a lower edge location of the electrical lap guide.

15. The electrical lap guide of claim 11 wherein the monitoring circuit performs real time computations of inflection points of conductance.

16. An electrical lap guide for use in lapping a feature layer, comprising:
    a pattern of conductive material including first and second electrical connections and a lapping region joining the first and second electrical connections, the lapping region having a edge exposed at an external surface, and the lapping region having a shape with a periodic feature to provide an electrical conductance at the first and second electrical connections that varies periodically as the external surface is lapped; and
    a monitoring circuit electrically connected to the first and second electrical connections.

17. The electrical lap guide of claim 16 wherein the monitoring circuit calibrates the location of a lapping surface.

18. The electrical lap guide of claim 16 wherein the monitoring circuit performs real time computations of inflection points of conductance.

19. The electrical lap guide of claim 16 wherein the lapping region includes a spatially periodic pattern that non-uniformly changes the electrical conductance in a spatially periodic manner to provide calibration data for precisely setting a lapping endpoint at a final lap line.

20. An electrical lap guide for use in lapping a feature layer, comprising:
    a substrate layer supporting the feature layer on a substrate layer surface that is perpendicular to an external surface;
    a pattern of conductive material on the substrate layer, the pattern of conductive material including first and second electrical interconnection pads and a lapping region conductively joining the first and second electrical interconnection pads, and
    periodic feature means for shaping the lapping region to provide an electrical conductance at the first and second electrical interconnection pads that varies periodically as the external surface is lapped.

21. The electrical lap guide of claim 20 wherein the feature layer comprises an encapsulation layer.

22. The electrical lap guide of claim 20 wherein the feature layer comprises a sensor stripe layer.

* * * * *